United States Patent
Glukhov

(10) Patent No.: US 10,628,884 B1
(45) Date of Patent: Apr. 21, 2020

(54) DATABASE-DRIVEN PROCESSING OF ALGORITHMIC TRADING PLANS UTILIZING SPECIALIZED USER INTERFACE METHODS, COMPUTER SYSTEMS AND COMPUTER PROGRAMS

(71) Applicant: Liquidnet Holdings, Inc., New York, NY (US)

(72) Inventor: Vacslav Glukhov, London (GB)

(73) Assignee: Liquidnet Holdings, Inc., New York, NY (US)

( * ) Notice: Subject to any disclaimer, the term of this patent is extended or adjusted under 35 U.S.C. 154(b) by 699 days.

(21) Appl. No.: 14/687,730

(22) Filed: Apr. 15, 2015

Related U.S. Application Data

(60) Provisional application No. 61/980,335, filed on Apr. 16, 2014.

(51) Int. Cl.
  *G06Q 40/04* (2012.01)
(52) U.S. Cl.
  CPC .................. *G06Q 40/04* (2013.01)
(58) Field of Classification Search
  None
  See application file for complete search history.

(56) References Cited

U.S. PATENT DOCUMENTS 5,414,809 A * 5/1995 Hogan ................. G06F 3/0481
  715/765
7,212,998 B1 * 5/2007 Muller ................. G06Q 40/00
  705/35

(Continued)

OTHER PUBLICATIONS

G. Nuti et al, Algorithmic Trading, Nov. 2011, Computer (vol. 44, Issue: 11, pp. 61-69) (Year: 2011).*

(Continued)

*Primary Examiner* — Mike Anderson
*Assistant Examiner* — Bolko M Hamerski
(74) *Attorney, Agent, or Firm* — Brian D. Kaul; Westman, Champlin & Koehler, P.A.

(57) ABSTRACT

In some embodiments, the present invention provides for processing, implementing, and/or managing user-defined electronic trading plans by utilizing specifically programmed intuitive, graphical user interfaces. In some embodiments, an exemplary GUI can have a first axis representing a security price parameter and a second axis representing a time parameter define a trading plan canvas. In some embodiments, an exemplary trading plan may employ pre-defined electronic trading algorithms and/or other ancillary trading functionality represented by a plurality of shapes, variable in size and position on the trading plan canvas. In some embodiments, an exemplary computer system can receive user's inputs concerning shape type, shape size and shape position on the trading plan canvas to define a trading plan including one or more electronic trading algorithms and/or ancillary trading functionalities at selected security price and/or time parameters to execute a given trading plan for a security.

23 Claims, 10 Drawing Sheets

(56) References Cited

U.S. PATENT DOCUMENTS

| | | | | |
|---|---|---|---|---|
| 7,882,014 B2* | 2/2011 | Shapiro | ............... | G06Q 40/04 |
| | | | | 705/37 |
| 8,296,221 B1* | 10/2012 | Waelbroeck | ........... | G06Q 40/04 |
| | | | | 705/37 |
| 2006/0259394 A1* | 11/2006 | Cushing | ............... | G06Q 40/04 |
| | | | | 705/37 |
| 2010/0057602 A1* | 3/2010 | Armutcu | ............... | G06Q 40/04 |
| | | | | 705/37 |
| 2010/0161512 A1* | 6/2010 | Tanpoco | ............ | G06F 3/04817 |
| | | | | 705/36 R |
| 2011/0093379 A1* | 4/2011 | Lane | ................... | G06Q 40/04 |
| | | | | 705/37 |
| 2012/0259762 A1* | 10/2012 | Tarighat | .................. | G06F 8/34 |
| | | | | 705/37 |
| 2014/0316968 A1* | 10/2014 | Peebler | ............... | G06Q 40/00 |
| | | | | 705/37 |
| 2014/0324656 A1* | 10/2014 | Neumann | ............ | G06Q 40/04 |
| | | | | 705/37 |
| 2015/0235318 A1* | 8/2015 | Huan | ................... | G06Q 40/04 |
| | | | | 705/37 |

OTHER PUBLICATIONS

G. Nuti et al; Algorithmic Trading, Nov. 2011, Computer (vol. 44, Issue: 11, pp. 61-69) (Year: 2011).*

Kuzman Ganchev, et al. 2009. Censored exploration and the Dark Pool Problem. In Proceedings of the Twenty-Fifth Conference on Uncertainty in Artificial Intelligence (UAI '09). AUAI Press, Arlington, Virginia, United States, 185-194. (Year: 2009).*

* cited by examiner

US 10,628,884 B1

DATABASE-DRIVEN PROCESSING OF ALGORITHMIC TRADING PLANS UTILIZING SPECIALIZED USER INTERFACE METHODS, COMPUTER SYSTEMS AND COMPUTER PROGRAMS

RELATED APPLICATION

This application claims the priority of U.S. provisional application No. 61/980,335, entitled "USER INTERFACE METHOD, SYSTEM AND COMPUTER PROGRAM FOR IMPLEMENTING ALGORITHMIC TRADING PLANS," filed Apr. 16, 2014, which is incorporated herein by reference in its entirety for all purposes.

FIELD OF THE INVENTION

The present invention is directed to electronic trading. More particularly, in some embodiments, the present invention is directed to methods, systems and computer program products for processing, implementing, and/or managing user-defined electronic trading plans, utilizing specifically programmed, intuitive graphical user interfaces. In some embodiments, the trading plans may employ trading algorithms and other ancillary trading functionality operating under various user-defined price and/or time constraints.

BACKGROUND

Algorithmic trading has become increasingly popular within the financial industry in recent years. An increasing number of traders are turning to algorithms as a lower cost and theoretically more efficient way to cope with various market inefficiencies and predatory trading behaviors. Algorithms are typically designed to analyze market data, identify liquidity opportunities, and arrive at intelligent trading decisions.

SUMMARY OF INVENTION

In some embodiments, the instant invention provides for a computer-implemented method, including at least steps of: causing, by a specifically programmed computer trading system, to concurrently display, over a computer network, at a plurality of computing devices of a plurality of users, at least one trading plan canvas graphical user interface to each user of the plurality of users, where, for each user of the plurality of users, the at least one trading plan canvas graphical user interface is specifically configured to at least: i) display: a first axis representing a security price parameter and a second axis representing a time parameter, where the first axis is oriented in perpendicular fashion to the second axis and the first and second axes together defining at least one trading plan canvas; ii) provide a plurality of pre-defined programmed trading algorithms for use in executing trades of securities, each pre-defined programmed trading algorithm represented by at least one particular shape of a particular type, the at least one particular shape variable in size and position on the at least one trading plan canvas; iii) receive user input concerning a selection, size and position of at least one first shape of a first type to be used on at least one first trading plan canvas, the at least one first shape of the first type corresponding to a first user-selected trading algorithm, being configurable to execute a first user-defined trading plan for at least one first security based, at least in part, on: 1) at least one first user-selected security price parameter, 2) a first user-selected time period; iv) display, on the at least one first trading plan canvas, the at least one first shape of the first type; and v) cause to execute the first user-defined trading plan for the at least one first security.

In some embodiments, the first axis represents the market price of the security.

In some embodiments, the second axis represents time during a trading day from market open to market close.

In some embodiments, the exemplary computer-implemented method of the present invention further includes: executing, by the specifically programmed computer trading system, the first user-defined trading plan for the at least one first security.

In some embodiments, the position of the at least one first shape along the first axis denotes a limit price for trading the at least one first security while employing the first user-selected trading algorithm during the first user-selected time period.

In some embodiments, a plurality of shapes of the first type are selected, sized and positioned on the trading plan canvas to execute a user-defined trading plan comprising multiple different pre-defined trading algorithms during different time periods.

In some embodiments, a plurality of shapes of the first type are selected, sized and positioned on the trading plan canvas to execute a user-defined trading plan comprising multiple different pre-defined trading algorithms at different limit prices.

In some embodiments, the at least one trading plan canvas graphical user interface is further specifically configured to display information concerning current progress of the first user-selected trading algorithm within the at least one first user-selected shape.

In some embodiments, the at least one trading plan canvas graphical user interface is further specifically configured to receive input concerning at least one user-selected execution venue associated with the first user-selected trading algorithm.

In some embodiments, the at least one trading plan canvas graphical user interface is further specifically configured to display information concerning at least one user-selected execution venue within the at least one first user-selected shape of the first type.

the at least one first shape of the first type is a rectangular block, and the first user-selected time In some embodiments, period is represented by a dimension of the rectangular block parallel to the second axis.

In some embodiments, the at least one trading plan canvas graphical user interface is further specifically configured to: provide a plurality of pre-defined, ancillary trading functionalities for use in executing trades of securities, each ancillary trading functionality represented by at least one second shape of a second type, the at least one second shape of the second type variable in a size and a position on the at least one first trading plan canvas; receive user input concerning a selection, size and position of the at least one second shape of the second type on the at least one first trading plan canvas, the at least one second shape of the second type corresponding to at least one user-selected ancillary trading functionality employing at least one second user-selected security price parameter operating during a second user-selected time period; and add the at least one user-selected ancillary trading functionality to the first user-defined trading plan.

In some embodiments, the present invention provides an exemplary specialized programmed computer system that includes at least the following computer modules: a non-transient memory having at least one region for storing computer executable program code; and a processor for executing the program code stored in the non-transient memory, where the program code includes: code to cause to concurrently display, over a computer network, at a plurality of computing devices of a plurality of users, at least one trading plan canvas graphical user interface to each user of the plurality of users, where, for each user of the plurality of users, the at least one trading plan canvas graphical user interface is specifically configured to at least: i) display: a first axis representing a security price parameter and a second axis representing a time parameter, where the first axis is oriented in perpendicular fashion to the second axis and the first and second axes together defining at least one trading plan canvas; ii) provide a plurality of pre-defined programmed trading algorithms for use in executing trades of securities, each pre-defined programmed trading algorithm represented by at least one particular shape of a particular type, the at least one particular shape variable in size and position on the at least one trading plan canvas; iii) receive user input concerning a selection, size and position of at least one first shape of a first type to be used on at least one first trading plan canvas, the at least one first shape of the first type corresponding to a first user-selected trading algorithm, being configurable to execute a first user-defined trading plan for at least one first security based, at least in part, on: 1) at least one first user-selected security price parameter, 2) a first user-selected time period; iv) display, on the at least one first trading plan canvas, the at least one first shape of the first type; and v) cause to execute the first user-defined trading plan for the at least one first security.

BRIEF DESCRIPTION OF THE DRAWINGS

The present invention will be understood and appreciated more fully from the following detailed description of the preferred embodiments, taken in conjunction with the drawings in which.

Figure 1:
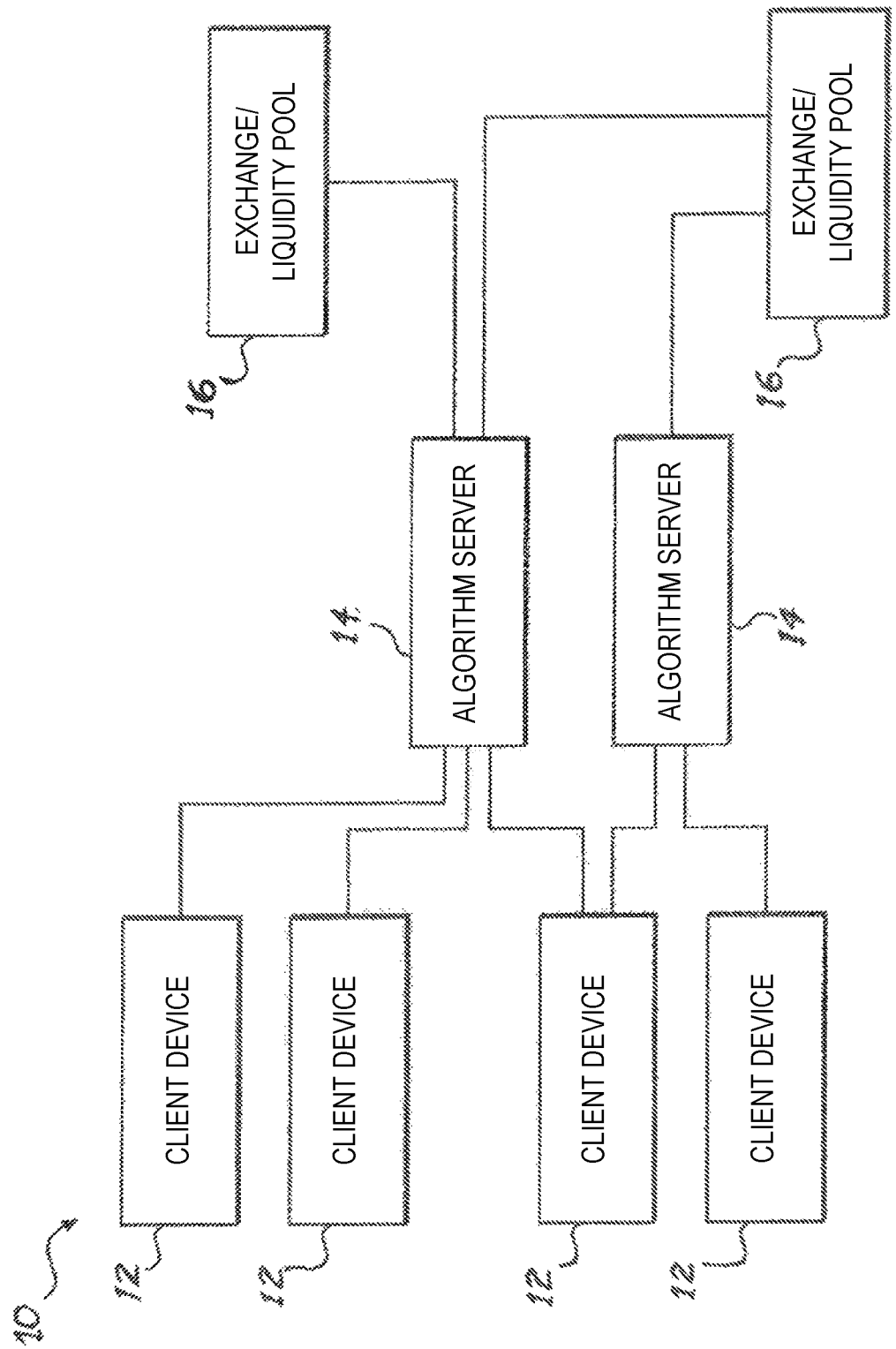
FIG. 1 illustrates a block diagram of an exemplary electronic trading system in accordance with some embodiments of the present invention.

The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention.

DETAILED DESCRIPTION

The embodiments described herein include, but are not limited to, various methods, systems and computer program products. In some embodiments, the present invention offers market participants (e.g., traders) intuitive and user friendly graphical user interfaces for creating, selecting, managing, evaluating and/or implementing user-defined electronic trading plans for securities (e.g., electronic trading algorithms).

In some embodiments, the present invention offers market participants (e.g., traders) control and transparency into the inner-logic of a given electronic trading plan/algorithm. In some embodiments, the inventive user interface methods, systems and computer programs of the instant invention provides intuitive graphical user interfaces that enable market participants (e.g., traders) to, for example, easily define and view a trading plan for executing a given order for a security by selecting, sizing and/or positioning one or more shapes on a "canvas", where each shape, for example, represents a pre-defined algorithm (or ancillary trading functionality) operating under one or more user-defined prices and/or time constraints defined by the position and/or size of the shape relative to the canvas.

In some embodiments, the present invention relates to computer-implemented methods that include at least the steps of (i) displaying, utilizing a specifically programmed computer system, a graphical user interface to a user, the graphical user interface including at least a first axis representing a security price parameter and a second axis representing a time parameter, the first axis oriented in perpendicular fashion to the second axis and the first and second axes together defining a trading plan canvas; (ii) providing, by the specifically programmed computer system, a plurality of pre-defined trading algorithms for use in executing trades of securities, each trading algorithm represented by a shape of a first type, the shape variable in size and position on the trading plan canvas; and (iii) receiving, by the specifically programmed computer system, user input concerning a selection, size and/or position of at least one shape of the first type on the trading plan canvas, the at least one shape of the first type corresponding to at least one user-selected trading algorithm employing at least one user-selected security price parameter operating during at least one user-selected time period to execute a user-defined trading plan for the security. In some embodiments, the computer-implemented methods of the present invention can further include step of (iv) implementing, by the specifically programmed computer system, the user-defined trading plan.

In some embodiments, the first axis of the trading plan canvas represents the market price of the security and the second axis represents time during a trading day, typically from market open to market close. In some embodiments, the position of the shape along the first axis may denote the limit price for trading the security while employing the user-selected trading algorithm during the at least one user-selected time period. In some embodiments, the at least one shape of the first type may be a substantially rectangular block, such that the user-selected time period is represented by one dimension of the substantially rectangular block along the second axis. A person of ordinary skill in the art will recognize that other shapes or geometries may also be suitable for use with the trading plan canvas, e.g., ovals, diamonds, etc.

In some embodiments, the present invention offers a plurality of shapes of the first type which are selected, sized and positioned on the trading plan canvas to execute at least one user-defined trading plan that can include multiple different pre-defined trading algorithms at different limit prices and/or during different time periods during a trading day or across multiple trading days. In some embodiments, information concerning the current progress of the at least one user-selected trading algorithm may be graphically displayed and/or indicated within the at least one user-selected shape. In some embodiments, information concerning the historical progress of the user's previous at least one user-selected trading algorithm may be graphically displayed and/or indicated on the canvas and/or within the at least one user-selected shape. In some embodiments, input concerning specific user-selected execution venues associated with the user-selected trading algorithm is received and information concerning the user-selected execution venues may be displayed within the at least one user-selected shape of the first type.

In some embodiments, a plurality of pre-defined, ancillary trading functionalities for use in executing trades of securities is also provided, where each ancillary trading functionality may be represented by a shape of a second type, the shape of the second type variable in size and position on the trading plan canvas. In some embodiments, user input concerning a shape type, shape size and/or shape position on the trading plan canvas is received, and is processed to implement at least one user-selected trading functionality employing at least one user-selected security price parameter during at least one user-selected time period. In some embodiments, the user-selected trading functionality may be added to the at least one user-defined trading plan, which may include other user-selected trading algorithm(s) and/or ancillary trading functionality(ies) having various limit price(s) and time constraint(s). In some embodiments, the shape of the second type may be the same as or different from the shape of the first type, or may have different characteristics, e.g., the shape of the first type and the shape of the second type may both be rectangular blocks, but may have different colors.

In some embodiments, the present invention relates to programmed computer systems having a non-transient memory with at least one region for storing computer executable program code; and at least one processor for executing the program code stored in the non-transient memory. In some embodiments, the program code may include: (i) code to display at least one graphical user interface to a user, the at least one graphical user interface which includes at least a first axis representing a security price parameter and a second axis representing a time parameter, the first axis oriented in perpendicular fashion to the second axis and the first and second axes together defining an algorithm building canvas; (ii) code to provide a plurality of pre-defined trading algorithms for use in executing trades of securities, each trading algorithm represented by a shape of a first type, the shape variable in size and/or position on the trading plan canvas; and (iii) code to receive user input concerning a selection, size and/or position of at least one shape of the first type on the trading plan canvas, the at least one shape of the first type corresponding to at least one user-selected trading algorithm employing at least one user-selected security price parameter operating during at least one user-selected time period to execute at least one user-defined trading plan for at least one security. In some preferred embodiments, code to implement the at least one user-defined trading plan may also be provided.

In some embodiments, a plurality of shapes of the first type may be selected, sized and/or positioned on the trading plan canvas to execute at least one user-defined trading plan that includes multiple different pre-defined trading algorithms operating within different limit price constraints and/or during different time periods. In some embodiments, the inventive programmed computer systems may also include code to provide a plurality of pre-defined, ancillary trading functionalities for use in executing trades of securities, each ancillary trading functionality represented by a shape of a second type, the shape of the second type variable in size and/or position on the trading plan canvas; code to receive user input concerning a selection, size and/or position of at least one shape of the second type on the trading plan canvas, the at least one shape of the second type corresponding to at least one user-selected trading functionality employing at least one user-selected security price parameter operating during at least one user-selected time period; and code to add the at least one user-selected trading functionality to the at least one user-defined trading plan. Some embodiments may include at least one trading plan library, e.g., code to store one or more user-defined trading plans and code to recall any such stored trading plans for subsequent future use.

Detailed Description FIG. 1 is a block diagram of an exemplary electronic trading system 10 in accordance with certain embodiments of the present invention. In some embodiments, the exemplary electronic trading system 10 can include one or more client devices 12, one or more algorithm servers 14, and one or more exchanges/liquidity pools 16. In some embodiments, the term "Exchange/liquidity pool" is broadly defined to include both lit and dark markets and liquidity pools, alternative trading systems (ATSs), electronic communication networks (ECNs), crossing networks, etc. In some embodiments, each client device 12 is in communication with one or more algorithm servers 14. In some embodiments, each algorithm server 14 is in communication with one or more exchanges/liquidity pools 16. In addition, although not expressly shown in FIG. 1, in some embodiments, a client device 12 may also be in direct communication with one or more exchanges/liquidity pools 16.

In some embodiments, client device 12 may be referred to as a trader terminal. In some embodiments, algorithm server 14 may be located physically near or at exchange/liquidity pool 16, while in other embodiments algorithm server 14 is a component of client device 12.

Figure 2:
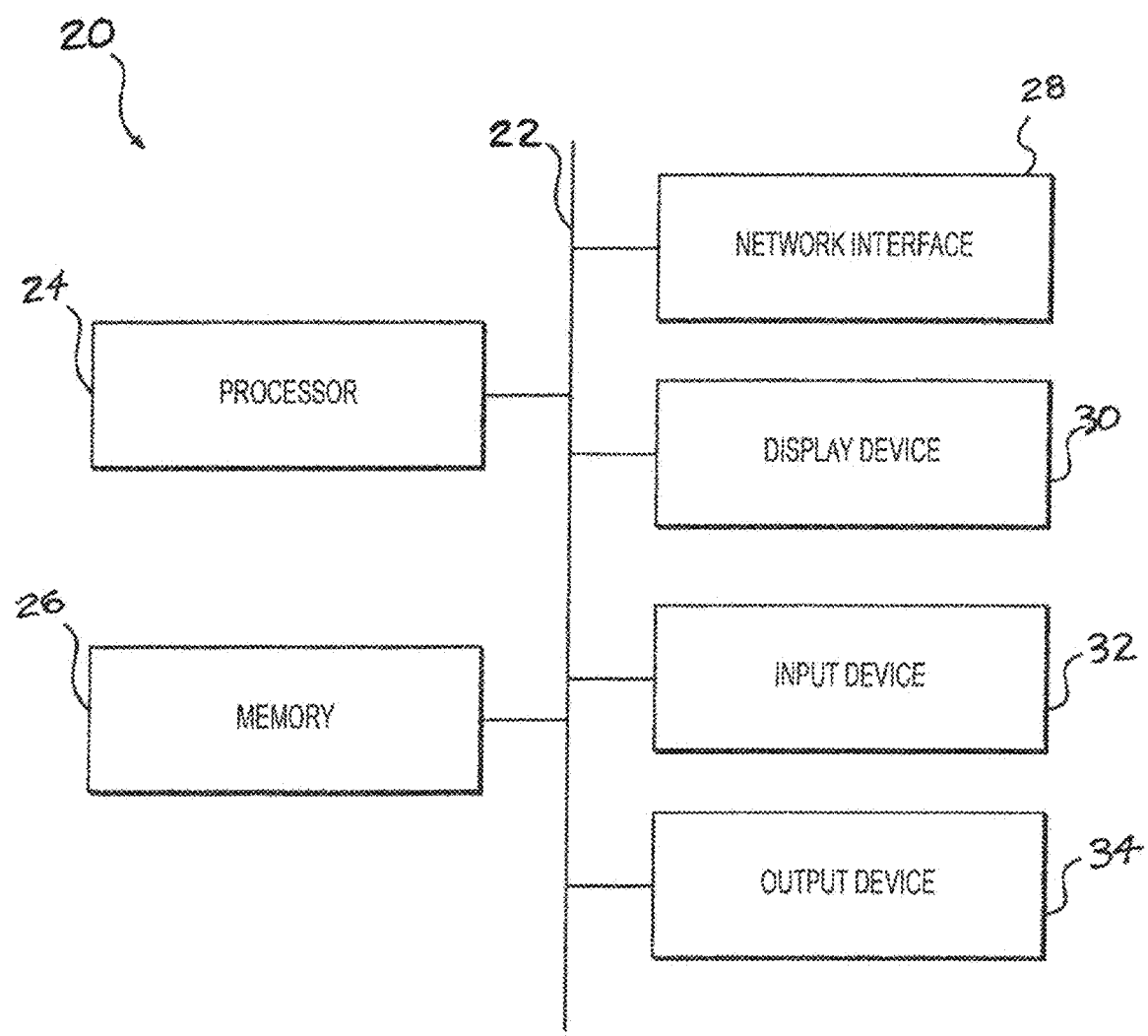
FIG. 2 illustrates a block diagram of an exemplary computing device according to certain embodiments.

Reference is now made to FIG. 2, which illustrates an exemplary block diagram of an exemplary computing device 20 according to certain embodiments. For example, client device 12 may include one or more computing devices 20. Similarly, algorithm server 14 may include one or more computing devices 20. In some embodiments, Exchange/liquidity source 16 may also include one or more computing devices 20.

In some embodiments, computing device 20 includes a bus 22, a processor 24, a memory 26, a network interface 28, a display device 30, an input device 32, and an output device 34. In some embodiments, the computing device 20 may include additional, different, or fewer components. In some embodiments, the computing device 20 may not include an output device 34 separate from the display device 30. In some embodiments, the computing device 20 may not include a display device 30.

In some embodiments, the processor 24 may be a single device or a combination of devices, such as associated with a network or distributed processing. In some embodiments, any processing strategy may be used, such as multi-processing, multi-tasking, parallel processing, and/or remote processing, for example. In some embodiments, processing may be local or remote and may be moved from one processor to another processor. In some embodiments, the processor 24 may be operable to execute logic encoded in one or more tangible media, such as memory 26 and/or via network interface 28. In some embodiments, the processor 24 may execute the logic to perform the functions, acts, or tasks illustrated in the figures or described herein.

In some embodiments, the memory 26 may be tangible media, such as computer readable storage media, for example. In some embodiments, the memory 26 may include a single device or multiple devices. For example, the memory 26 may include random access memory and hard drive storage. In some embodiments, the memory 26 may be adjacent to, part of, programmed with, networked with, and/or remote from processor 24, such that data stored in the memory 26 may be retrieved and processed by the processor 24. In some embodiments, the memory 26 may store instructions that are executable by the processor 24. In some embodiments, the instructions may be executed to perform one or more of the acts or functions described herein or shown in the figures.

In some embodiments, the display device 30 may include a visual output device (e.g., electronic display, electronic paper, flat panel display, light-emitting diode (LED) displays, etc.) In some embodiments, the display device 30 is adapted to display an interactive trading screen allowing, for example, one or more trading actions to be performed using the trading screen. For example, an interactive trading screen may allow one or more order entry parameters to be set and/or sent using one or more order entry actions. In some embodiments, the display device 30 and/or input device 32 may be used to interact with the trading screen.

In some embodiments, the input device 32 may include a keyboard, mouse, microphone, touch-screen, trackball, keypad, joystick, and/or other device for providing input, for example. In some embodiments, the input device 32 may be used, for example, to provide command selections to processor 24. For example, the input device 32 may be a mouse or touchpad that is used to control a cursor displayed on a trading screen.

Figure 3:
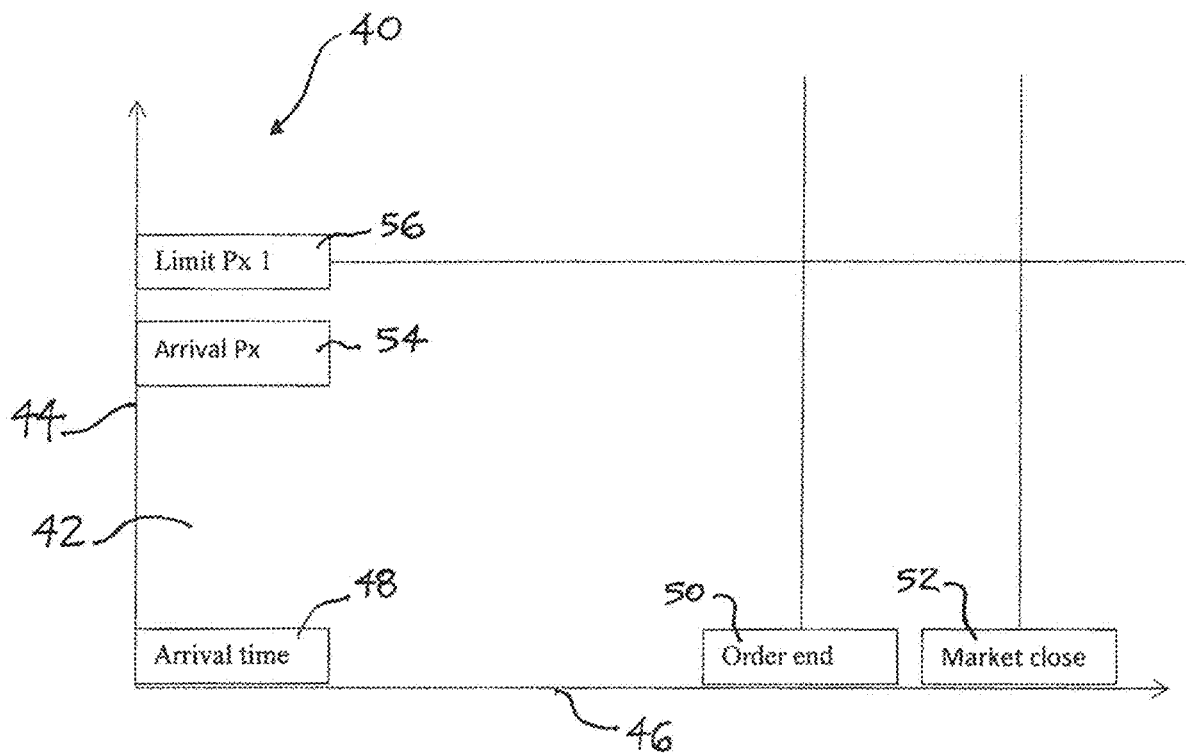
FIG. 3 illustrates an exemplary trading interface in accordance with some embodiments of the present invention.

FIG. 3 illustrates an exemplary trading interface 40 in accordance with certain embodiments of the present invention. In some embodiments, a exemplary trading plan canvas 42 includes an X-axis 46 and a Y-axis 44, where X-axis 46 denotes the time during a trading day and Y-axis 44 denotes the price of a security or other tradable asset As shown, in some embodiments, a user can mark the order arrival time 48, order end 50 and market close 52 along X-axis 46 on canvas 42. Similarly, a user can mark the arrival price 54 and a limit price 56 along Y-axis 44. In some embodiments, a trader can add any number of time and/or price markers on canvas 42 to express his or her trading objective(s).

Figure 4:
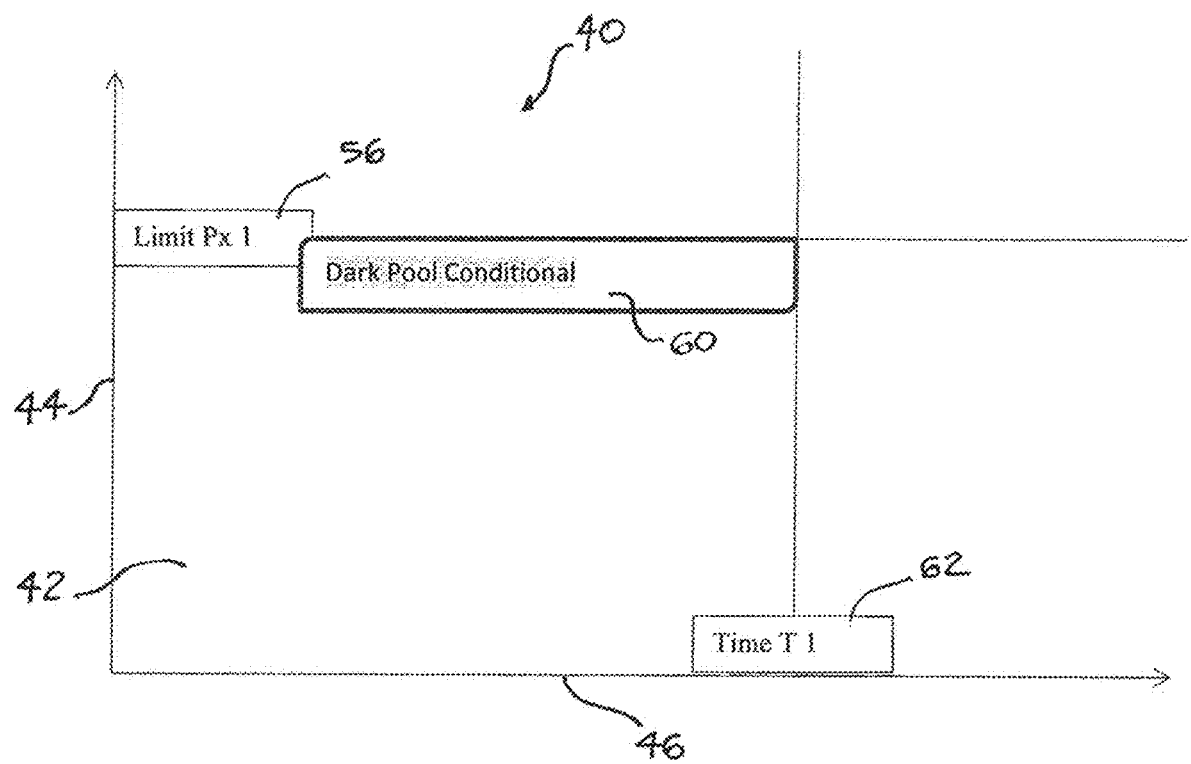
FIGS. 4-9 illustrate exemplary trading interfaces according to certain embodiments.

FIGS. 4-9 illustrate exemplary trading interfaces according to certain embodiments of the present invention, where algorithms or trading "strategies" may be represented by "draggable", "snappable" and/or resizable shapes. As shown in FIG. 4, an exemplary "Dark Pool Conditional" algorithm, selected from a plurality of pre-defined trading algorithms having various characteristics, is represented by an exemplary substantially rectangular block 60 on the exemplary trading plan canvas 42. In some embodiments, the algorithm represented by block 60 is trading within the specified time constraint 62 along axis 46 at the specified price limit 56 along axis 44. In some embodiments, time constraint 62 and price constraint 56 are selected by the trader as he or she sizes and positions block 60 on canvas 42 by dragging and resizing block 60 on canvas 42.

Figure 5:
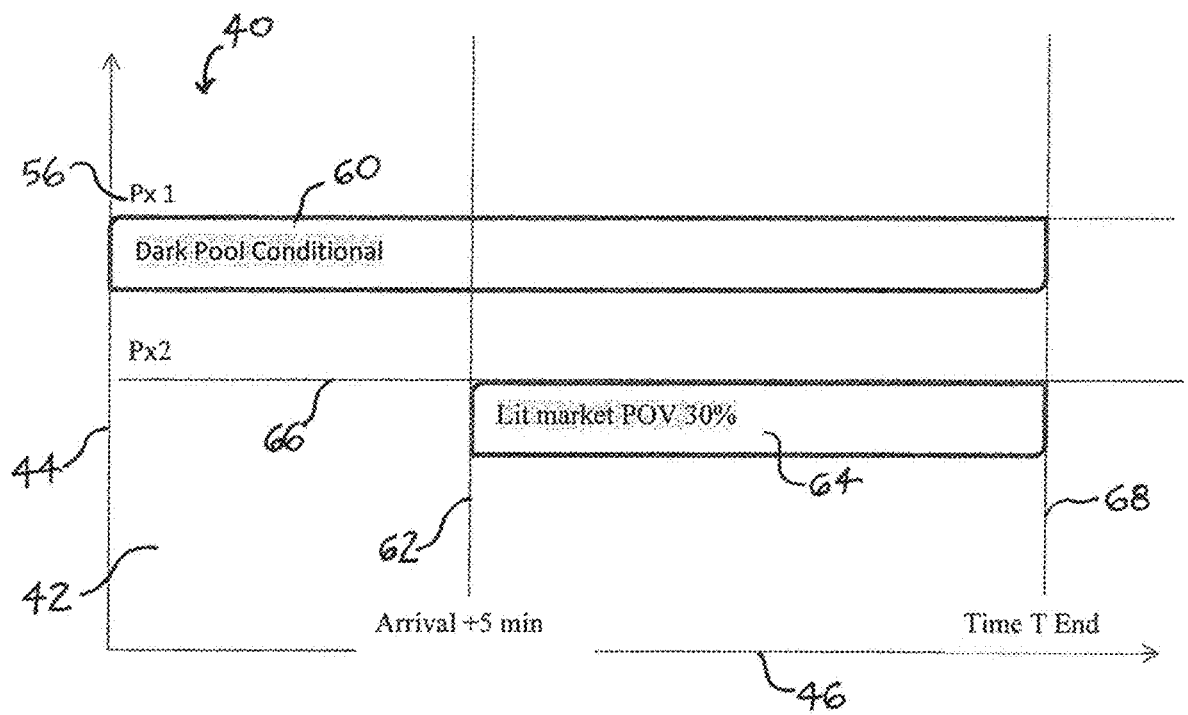

In some embodiments, the user-defined trading plan shown on the trading interface of FIG. 5 includes one algorithm ("Dark Pool Conditional") represented by block 60 operating alone for five minutes at limit price 56. At time 62, a second algorithm ("Lit Market POV 30%") represented by block 64 operating at price constraint 66 joins the algorithm represented by block 60. Both algorithms 60, 64 will work at their respective price constraints 56, 66 until time 68.

Figure 6:
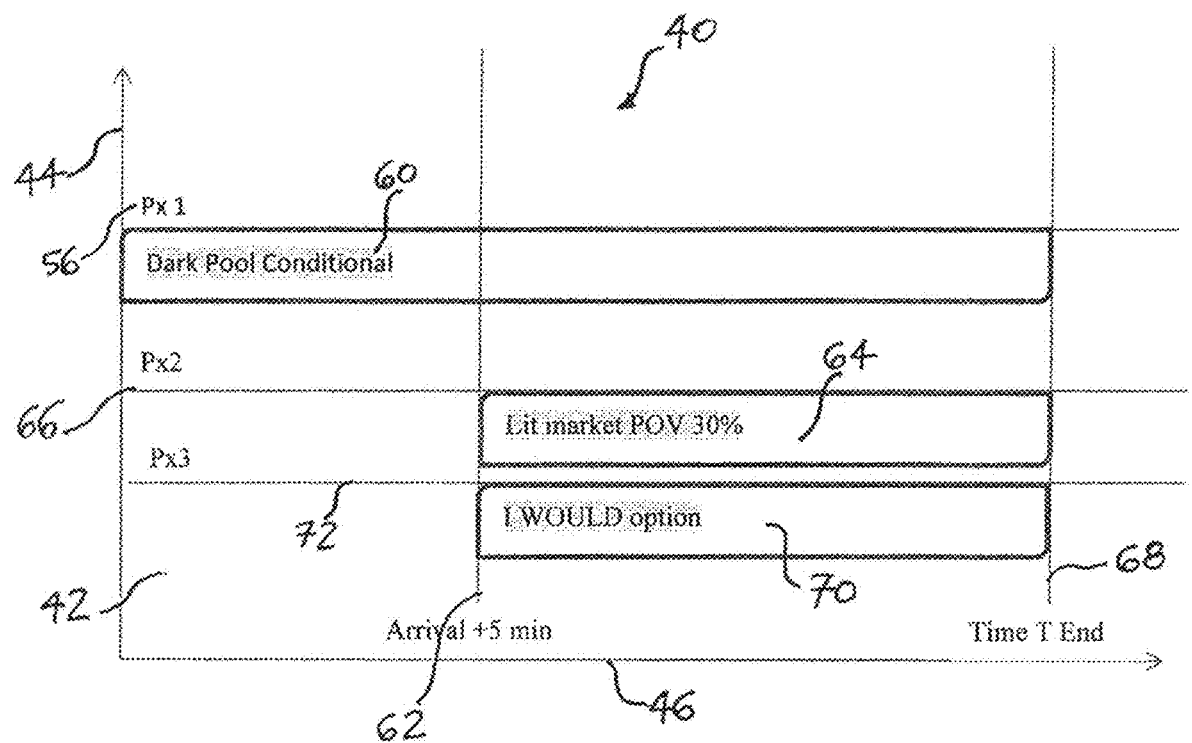

In some embodiments, the user-defined trading plan shown on the trading interface of FIG. 6 includes one algorithm ("Dark Pool Conditional") represented by block 60 operating alone for five minutes at limit price 56. At time 62, two additional algorithms join the algorithm represented by block 60—a second algorithm ("Lit Market POV 30%") represented by block 64 operating at price constraint 66 and a third algorithm ("I WOULD option") represented by block 70 operating at price constraint 72. From time 62 until specified ending time 68, all three algorithms represented by blocks 60, 64, 70 will work at their respective price constraints 56, 66, and 72.

Figure 7:
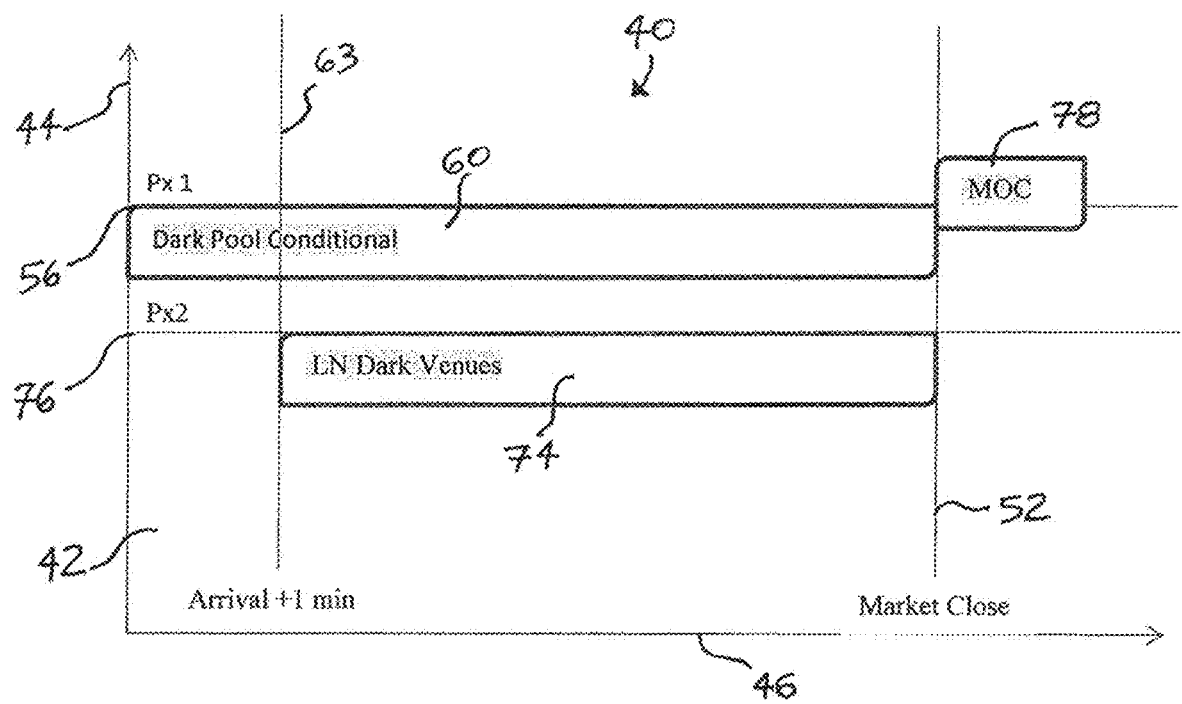

FIG. 7 shows an exemplary user-defined trading plan that includes one algorithm ("Dark Pool Conditional") represented by block 60 operating alone for one minute at limit price 56. At time 63, one additional pre-defined algorithm ("LN Dark Venues") represented by block 74 operating at price constraint 76 joins the algorithm represented by block 60. As shown, a third block 78 representing "Market on Close" (MOC) trading functionality is added at market close 52 as part of the user-defined trading plan. In some embodiments, additional conditions can be specified on the canvas before the block representing MOC functionality 78 is employed. For example, if the residual amount of the order is less than 10% of the target amount, the MOC functionality would be employed upon market close 52. Other pre-defined ancillary trading functionalities may be represented by blocks, or other appropriate shapes, sized and/or placed on the trading plan canvas 42 to further specify user-selected condition(s), such as different market circumstance(s), pertaining to the desired trading plan.

Figure 8:
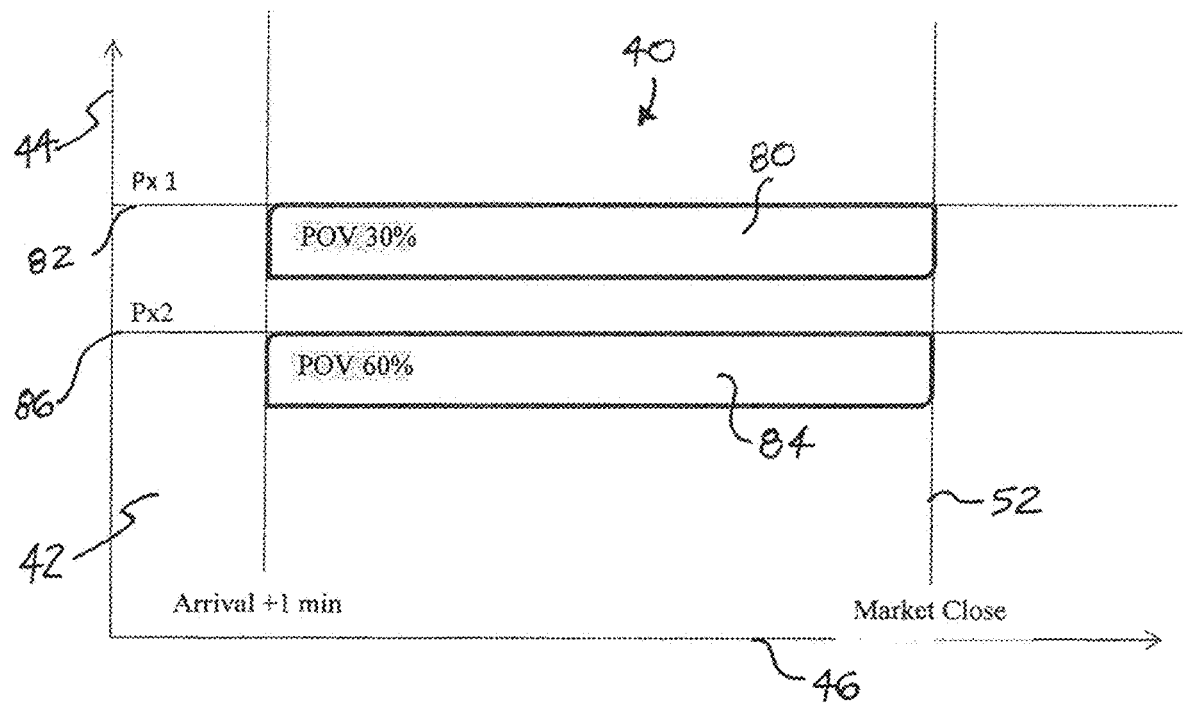

As shown in FIG. 8, in some embodiments, if there are two or more algorithms of the same type operating at the same time, e.g., POV 30% represented by block 80 and POV 60% represented by block 84, the algorithm corresponding to the dominating value of the parameter will dominate all others. As shown, if price is better, i.e., below, 86, only the "POV 60%" algorithm represented by block 84 will execute orders. In some embodiments, changes to the layout of algorithm blocks, and their corresponding time and price "coordinates" on canvas 42 are translated by one or more processors to implement the user-defined trading plan(s).

Figure 9:
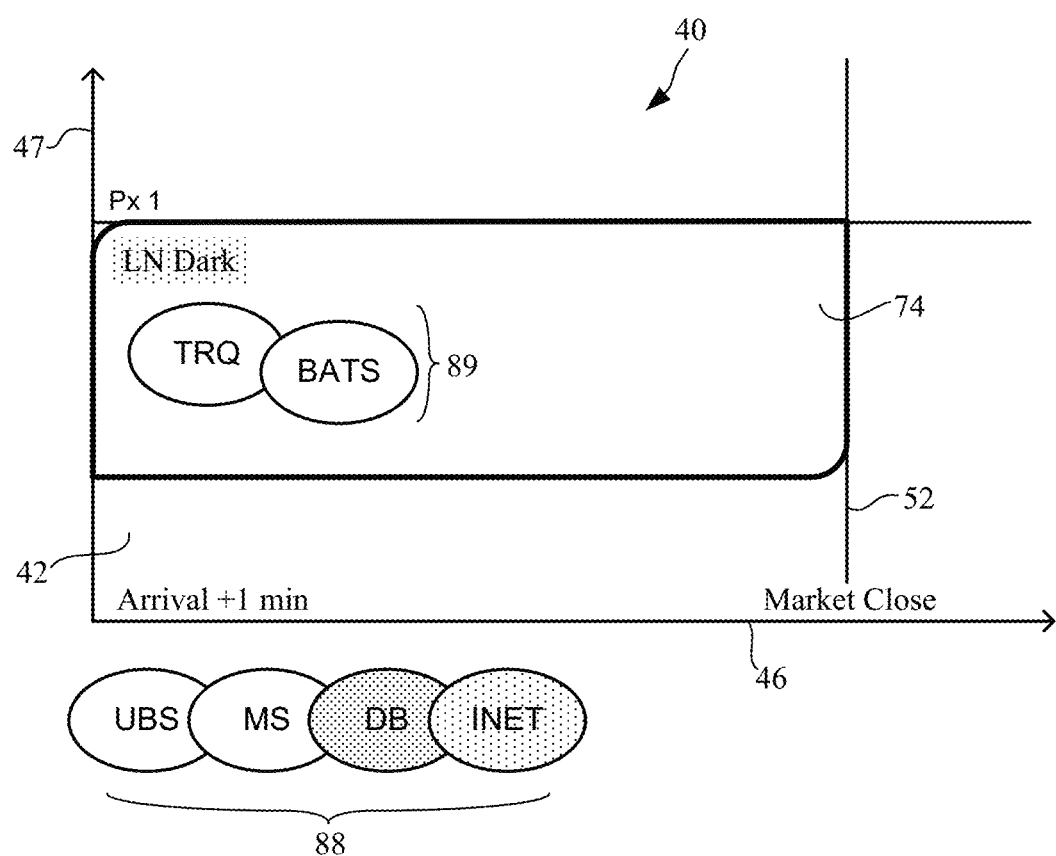
Figure 10A:
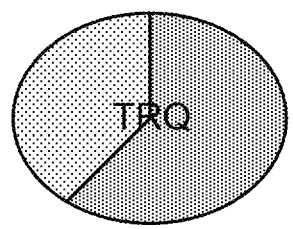
FIGS. 10A-10B illustrate graphical elements that may be displayed on a trading interface according to certain embodiments.
Figure 10B:
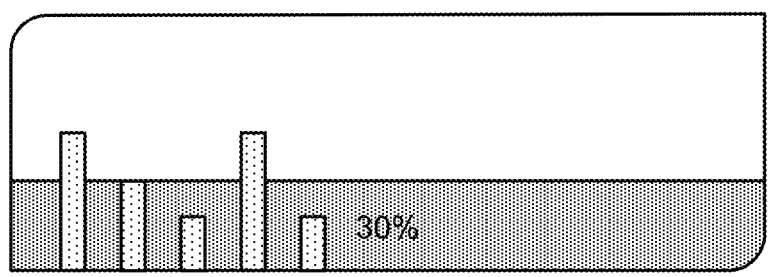

As shown in FIG. 9, FIG. 10A and FIG. 10B, in some embodiments, trading plan canvas 42 and/or algorithms represented by blocks 74 may be useful for monitoring information concerning the progress and configuration of an algorithm. For example, in FIG. 9, the LN Dark algorithm represented by block 74 allows a user to view and select the specific trading venues associated with the algorithm. In some embodiments, user-selected trading venues 89 are displayed within block 74 on canvas 42, while additional available venues 88 are shown below canvas 42. In some embodiments, as shown in FIG. 10A, a trading venue indicator 90 may show the fraction of an order filled in a given trading venue/destination. In some embodiments, as shown in FIG. 10B, an algorithm block 92 can display the desired market participation (30%) and the actual participation 94 (averaged over one minute, for example).

Among those benefits and improvements that have been disclosed, other objects and advantages of this invention can become apparent from the description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiment, the inventive systems processes information for a large number of users (e.g., at least 100; at least 500; at least 1,000; at least 10,000; at least 100,000; at least 1,000,000, etc.) and concurrent transactions (e.g., at least 100; at least 500; at least 1,000; at least 10,000; at least 100,000; at least 1,000,000, etc.).

It is understood that at least one aspect/functionality of various embodiments described herein can be performed in real-time and/or dynamically. As used herein, the term "real-time" is directed to an event/action can occur instantaneously or almost instantaneously in time when another event/action has occurred. In some embodiments, the terms "instantaneous," "instantaneously," "instantly," and "in real time" refer to a condition where a time difference between sequential actions/events is no more than 1 minute. In some embodiments, the time difference between the sequential actions/events is no more than 1 second. In some embodiments, the time difference between the sequential actions/events is no more than millisecond.

As used herein, the term "dynamic(ly)" is directed to an event/action that can occur without any human intervention. In some embodiments, the dynamic event/action may be in real-time, hourly, daily, weekly, monthly, etc.

In some embodiments, the instant invention provides for a computer-implemented method, including at least steps of: causing, by a specifically programmed computer trading system, to concurrently display, over a computer network, at a plurality of computing devices of a plurality of users, at least one trading plan canvas graphical user interface to each user of the plurality of users, where, for each user of the plurality of users, the at least one trading plan canvas graphical user interface is specifically configured to at least: i) display: a first axis representing a security price parameter and a second axis representing a time parameter, where the first axis is oriented in perpendicular fashion to the second axis and the first and second axes together defining at least one trading plan canvas; ii) provide a plurality of pre-defined programmed trading algorithms for use in executing trades of securities, each pre-defined programmed trading algorithm represented by at least one particular shape of a particular type, the at least one particular shape variable in size and position on the at least one trading plan canvas; iii) receive user input concerning a selection, size and position of at least one first shape of a first type to be used on at least one first trading plan canvas, the at least one first shape of the first type corresponding to a first user-selected trading algorithm, being configurable to execute a first user-defined trading plan for at least one first security based, at least in part, on: 1) at least one first user-selected security price parameter, 2) a first user-selected time period; iv) display, on the at least one first trading plan canvas, the at least one first shape of the first type; and v) cause to execute the first user-defined trading plan for the at least one first security.

In some embodiments, the first axis represents the market price of the security. In some embodiments, the second axis represents time during a trading day from market open to market close.

In some embodiments, the exemplary computer-implemented method of the present invention further includes: executing, by the specifically programmed computer trading system, the first user-defined trading plan for the at least one first security.

In some embodiments, the position of the at least one first shape along the first axis denotes a limit price for trading the at least one first security while employing the first user-selected trading algorithm during the first user-selected time period.

In some embodiments, a plurality of shapes of the first type are selected, sized and positioned on the trading plan canvas to execute a user-defined trading plan comprising multiple different pre-defined trading algorithms during different time periods.

In some embodiments, a plurality of shapes of the first type are selected, sized and positioned on the trading plan canvas to execute a user-defined trading plan comprising multiple different pre-defined trading algorithms at different limit prices.

In some embodiments, the at least one trading plan canvas graphical user interface is further specifically configured to display information concerning current progress of the first user-selected trading algorithm within the at least one first user-selected shape.

In some embodiments, the at least one trading plan canvas graphical user interface is further specifically configured to receive input concerning at least one user-selected execution venue associated with the first user-selected trading algorithm.

In some embodiments, the at least one trading plan canvas graphical user interface is further specifically configured to display information concerning at least one user-selected execution venue within the at least one first user-selected shape of the first type.

In some embodiments, the at least one first shape of the first type is a rectangular block, and the first user-selected time In some embodiments, period is represented by a dimension of the rectangular block parallel to the second axis.

In some embodiments, the at least one trading plan canvas graphical user interface is further specifically configured to: provide a plurality of pre-defined, ancillary trading functionalities for use in executing trades of securities, each ancillary trading functionality represented by at least one second shape of a second type, the at least one second shape of the second type variable in a size and a position on the at least one first trading plan canvas; receive user input concerning a selection, size and position of the at least one second shape of the second type on the at least one first trading plan canvas, the at least one second shape of the second type corresponding to at least one user-selected ancillary trading functionality employing at least one second user-selected security price parameter operating during a second user-selected time period; and add the at least one user-selected ancillary trading functionality to the first user-defined trading plan.

In some embodiments, the present invention provides an exemplary specialized programmed computer system that includes at least the following computer modules: a non-transient memory having at least one region for storing computer executable program code; and a processor for executing the program code stored in the non-transient memory, where the program code includes: code to cause to concurrently display, over a computer network, at a plurality of computing devices of a plurality of users, at least one trading plan canvas graphical user interface to each user of the plurality of users, where, for each user of the plurality of users, the at least one trading plan canvas graphical user interface is specifically configured to at least: i) display: a first axis representing a security price parameter and a second axis representing a time parameter, where the first axis is oriented in perpendicular fashion to the second axis and the first and second axes together defining at least one trading plan canvas; ii) provide a plurality of pre-defined programmed trading algorithms for use in executing trades of securities, each pre-defined programmed trading algorithm represented by at least one particular shape of a particular type, the at least one particular shape variable in size and position on the at least one trading plan canvas; iii) receive user input concerning a selection, size and position of at least one first shape of a first type to be used on at least one first trading plan canvas, the at least one first shape of the first type corresponding to a first user-selected trading algorithm, being configurable to execute a first user-defined trading plan for at least one first security based, at least in part, on: 1) at least one first user-selected security price parameter, 2) a first user-selected time period; iv) display, on the at least one first trading plan canvas, the at least one first shape of the first type; and v) cause to execute the first user-defined trading plan for the at least one first security.

While the present invention has been described with reference to the preferred embodiments, those skilled in the art will recognize that numerous variations and modifications may be made without departing from the scope of the present invention.

What is claimed is:

1. A computer-implemented method, comprising:
causing, by a specifically programmed computer trading system, to concurrently display, over a computer network, at a plurality of computing devices of a plurality of users, at least one trading plan canvas graphical user interface to each user of the plurality of users,
wherein, for each user of the plurality of users, the at least one trading plan canvas graphical user interface is specifically configured to at least:
display:
a first axis representing a security price parameter and a second axis representing a time parameter,
wherein the first axis is oriented in perpendicular fashion to the second axis and the first and second axes together defining at least one trading plan canvas;
provide a plurality of pre-defined programmed dark pool trading algorithms for executing trades of securities, each trading algorithm configured to analyze market data and identify liquidity opportunities to arrive at trading decisions, each pre-defined programmed trading algorithm represented by at least one particular shape of a particular type, the at least one particular shape variable in size and position on the at least one trading plan canvas;
receive user input concerning a selection, size and position of at least one first shape of a first type to be used on at least one first trading plan canvas, the at least one first shape of the first type corresponding to a first user-selected trading algorithm, which is configured to execute a first user-defined trading plan for at least one first security based, at least in part, on:
at least one first user-selected security price parameter, and
a first user-selected time period, during which the first user-defined trading plan is operational, the first user-selected time period defined by a dimension of the at least one first shape along the second axis;
display, on the at least one first trading plan canvas, the at least one first shape of the first type;
cause to execute the first user-defined trading plan for the at least one first security; and
display information concerning current progress of the first user-selected trading algorithm within the at least one first user-selected shape.

2. The method of claim 1, wherein the first axis represents the market price of the security.

3. The method of claim 2, wherein the second axis represents time during a trading day from market open to market close.

4. The method of claim 3, further comprising
executing, by the specifically programmed computer trading system, the first user-defined trading plan for the at least one first security.

5. The method of claim 3, wherein the position of the at least one first shape along the first axis denotes a limit price for trading the at least one first security while employing the first user-selected trading algorithm during the first user-selected time period.

6. The method of claim 3, wherein a plurality of shapes of the first type are selected, sized and positioned on the trading plan canvas to execute a user-defined trading plan comprising multiple different pre-defined trading algorithms during different time periods.

7. The method of claim 5, wherein a plurality of shapes of the first type are selected, sized and positioned on the trading plan canvas to execute a user-defined trading plan comprising multiple different pre-defined trading algorithms at different limit prices.

8. The method of claim 1, wherein the at least one trading plan canvas graphical user interface is further specifically configured to:
receive input concerning at least one user-selected execution venue associated with the first user-selected trading algorithm.

9. The method of claim 8, wherein the at least one trading plan canvas graphical user interface is further configured to:
display a listing of the at least one user-selected execution venue associated with the first user-selected trading algorithm within the at least one first user-selected shape of the first type; and
display a plurality of trading venues associated with the first user-selected trading algorithm outside the at least one first user-selected shape of the first type.

10. The method of claim 3, wherein the at least one first shape of the first type is a rectangular block, and the first user-selected time period is represented by the dimension of the rectangular block parallel to the second axis.

11. The method of claim 1, wherein the at least one trading plan canvas graphical user interface is further specifically configured to:
provide a plurality of pre-defined, ancillary trading functionalities for use in executing trades of securities, each ancillary trading functionality represented by at least one second shape of a second type, the at least one second shape of the second type variable in a size and a position on the at least one first trading plan canvas;
receive user input concerning a selection, size and position of the at least one second shape of the second type on the at least one first trading plan canvas, the at least one second shape of the second type corresponding to at least one user-selected ancillary trading functionality employing at least one second user-selected security price parameter operating during a second user-selected time period, wherein the second user-selected time period is defined by a dimension of the at least one second shape along the second axis; and
add the at least one user-selected ancillary trading functionality to the first user-defined trading plan.

12. A programmed computer system, comprising:
a non-transient memory having at least one region for storing computer executable program code; and
a processor for executing the program code stored in the non-transient memory, wherein the program code comprises:
code to cause to concurrently display, over a computer network, at a plurality of computing devices of a plurality of users, at least one trading plan canvas graphical user interface to each user of the plurality of users,
wherein, for each user of the plurality of users, the at least one trading plan canvas graphical user interface is specifically configured to at least:
display:
a first axis representing a security price parameter and a second axis representing a time parameter,
wherein the first axis is oriented in perpendicular fashion to the second axis and the first and second axes together defining at least one trading plan canvas;
provide a plurality of pre-defined programmed dark pool trading algorithms for use in executing trades of securities, each trading algorithm configured to analyze market data and identify liquidity opportunities to arrive at trading decisions, each pre-defined programmed trading algorithm represented by at least one particular shape of a particular type, the at least one particular shape variable in size and position on the at least one trading plan canvas;
receive user input concerning a selection, size and position of at least one first shape of a first type to be used on at least one first trading plan canvas, the at least one first shape of the first type corresponding to a first user-selected trading algorithm, which is configured to execute a first user-defined trading plan for at least one first security based, at least in part, on:
at least one first user-selected security price parameter, and
a first user-selected time period, during which the first user-defined trading plan is operational, the first user-selected time period defined by a dimension of the at least one first shape along the second axis;
display, on the at least one first trading plan canvas, the at least one first shape of the first type;
cause to execute the first user-defined trading plan for the at least one first security; and
display information concerning current progress of the first user-selected trading algorithm within the at least one first user-selected shape.

13. The programmed computer system of claim 12, wherein the first axis represents the market price of the security.

14. The programmed computer system of claim 13, wherein the second axis represents time during a given trading day from market open to market close.

15. The programmed computer system of claim 14, further comprising code to execute the first user-defined trading plan for the at least one first security.

16. The programmed computer system of claim 14, wherein the position of the at least one first shape along the first axis denotes a limit price for trading the at least one first security while employing the first user-selected trading algorithm during the first user-selected time period.

17. The programmed computer system of claim 14, wherein a plurality of shapes of the first type are selected, sized and positioned on the trading plan canvas to execute a user-defined trading plan comprising multiple different pre-defined trading algorithms during different time periods.

18. The programmed computer system of claim 16, wherein a plurality of shapes of the first type are selected, sized and positioned on the trading plan canvas to execute a user-defined trading plan comprising multiple different pre-defined trading algorithms at different limit prices.

19. The programmed computer system of claim 12, wherein the at least one trading plan canvas graphical user interface is further specifically configured to:
receive input concerning at least one user-selected execution venue associated with the first user-selected trading algorithm.

20. The programmed computer system of claim 19, wherein the at least one trading plan canvas graphical user interface is further configured to:
display a listing of the at least one user-selected execution venue associated with the first user-selected trading algorithm within the at least one first user-selected shape of the first type; and
display a plurality of trading venues associated with the first user-selected trading algorithm outside the at least one first user-selected shape of the first type.

21. The programmed computer system of claim 14, wherein the at least one first shape of the first type is a rectangular block, and the first user-selected time period is represented by the dimension of the rectangular block parallel to the second axis.

22. The programmed computer system of claim 12, wherein the at least one trading plan canvas graphical user interface is further specifically configured to:
provide a plurality of pre-defined, ancillary trading functionalities for use in executing trades of securities, each ancillary trading functionality represented by at least one second shape of a second type, the at least one second shape of the second type variable in a size and a position on the at least one first trading plan canvas;
receive user input concerning a selection, size and position of the at least one second shape of the second type on the at least one first trading plan canvas, the at least one second shape of the second type corresponding to at least one user-selected ancillary trading functionality employing at least one second user-selected security price parameter operating during a second user-selected time period, wherein the second user-selected time period is defined by a dimension of the at least one second shape along the second axis; and add the at least one user-selected ancillary trading functionality to the first user-defined trading plan.

23. The programmed computer system of claim 12, further comprising code to store the first user-defined trading plan in a database and code to recall, from the database, the first user defined trading plan for subsequent use.

\* \* \* \* \*